United States Patent [19]

Schaefer

[11] 4,289,988

[45] Sep. 15, 1981

[54] CENTRIFUGAL MECHANISM AND SWITCH

[75] Inventor: Edward J. Schaefer, Bluffton, Ind.

[73] Assignee: Franklin Electric Co., Inc., Bluffton, Ind.

[21] Appl. No.: 82,127

[22] Filed: Oct. 5, 1979

Related U.S. Application Data

[63] Continuation-in-part of Ser. No. 961,846, Nov. 20, 1978, abandoned.

[51] Int. Cl.$^3$ .................................................. H02K 11/00
[52] U.S. Cl. ................................. 310/68 E; 200/80 R; 73/538
[58] Field of Search ................. 73/535, 536, 538, 537; 200/80 R, 61.46; 310/68 E; 318/793, 325; 340/670, 671

[56] References Cited

U.S. PATENT DOCUMENTS

| | | | |
|---|---|---|---|
| 2,516,922 | 8/1950 | Schaefer | 200/80 R |
| 2,610,314 | 9/1952 | Morse | 200/80 R |
| 2,925,155 | 2/1960 | Easton | 318/793 |
| 3,244,832 | 4/1966 | Schaefer | 200/80 R |
| 3,521,496 | 7/1970 | Schaefer | 200/80 R |

Primary Examiner—Gerald P. Tolin
Attorney, Agent, or Firm—Merriam, Marshall & Bicknell

[57] ABSTRACT

This disclosure relates to a centrifugal mechanism and switch construction particularly for use in an electric motor. The mechanism includes a support part that is secured to and rotates with the motor shaft, and a weight that is carried by the support part. The weight has its center of gravity to one side of the motor axis, and the weight is pivotally attached to the support part. Centrifugal force tends to swing the weight in one direction and springs connected between the support part and the weight tend to counter the centrifugal force. A lightweight disc is pivotally connected to the moving end of the weight, the disc being located to activate the switch. The weight and a hinge member form a parallel arm connection between the disc and the support part.

15 Claims, 14 Drawing Figures

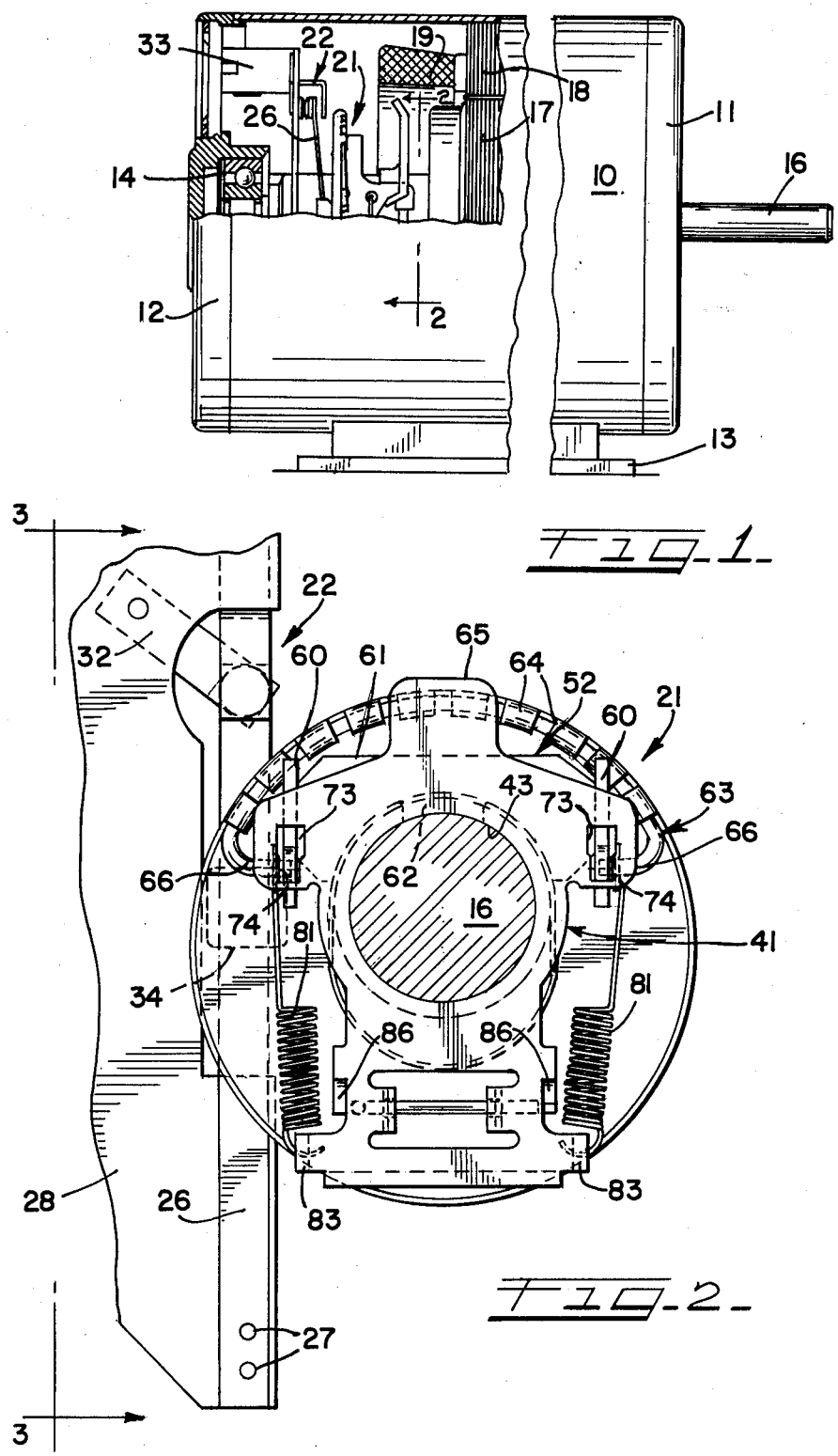

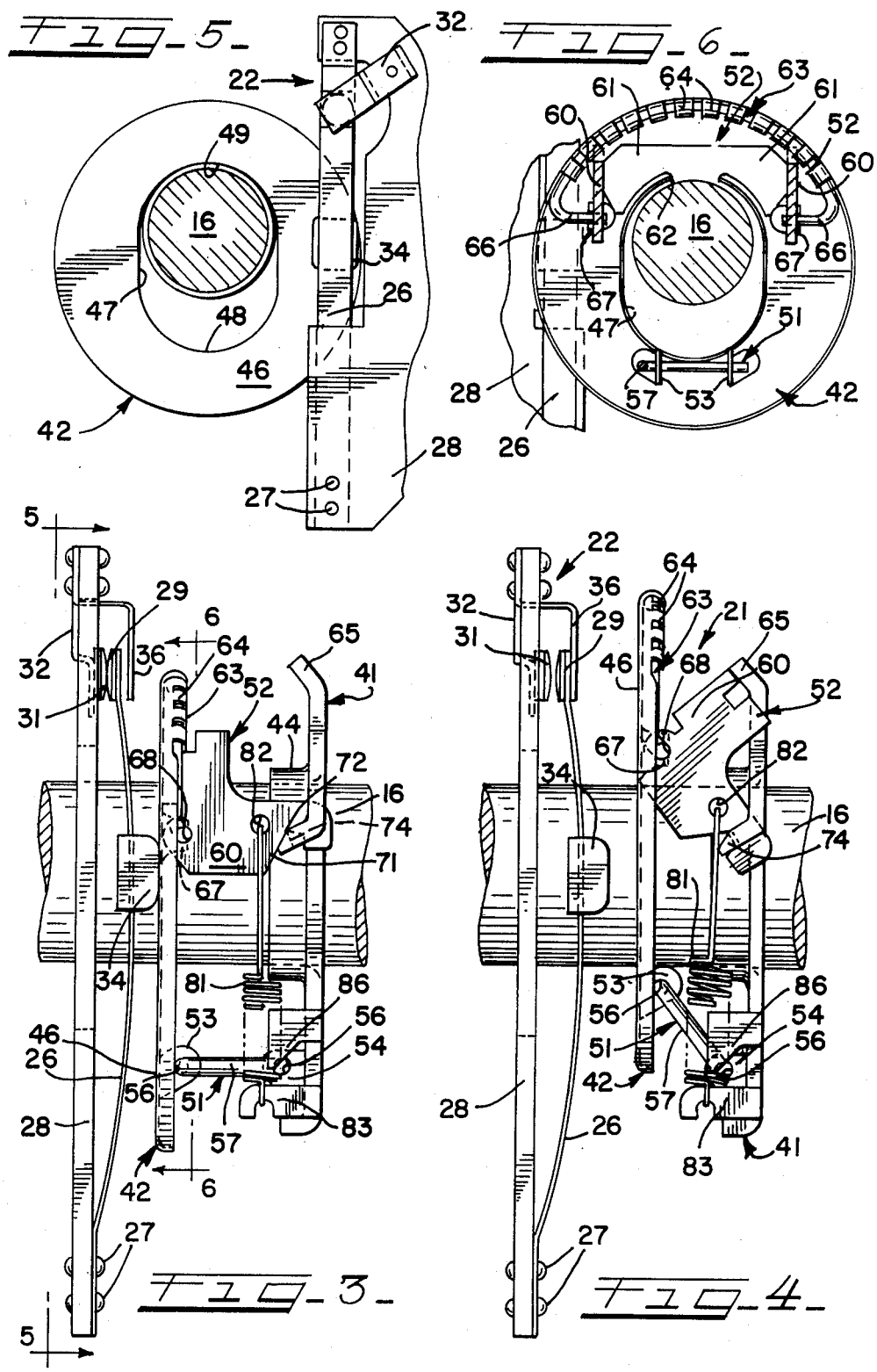

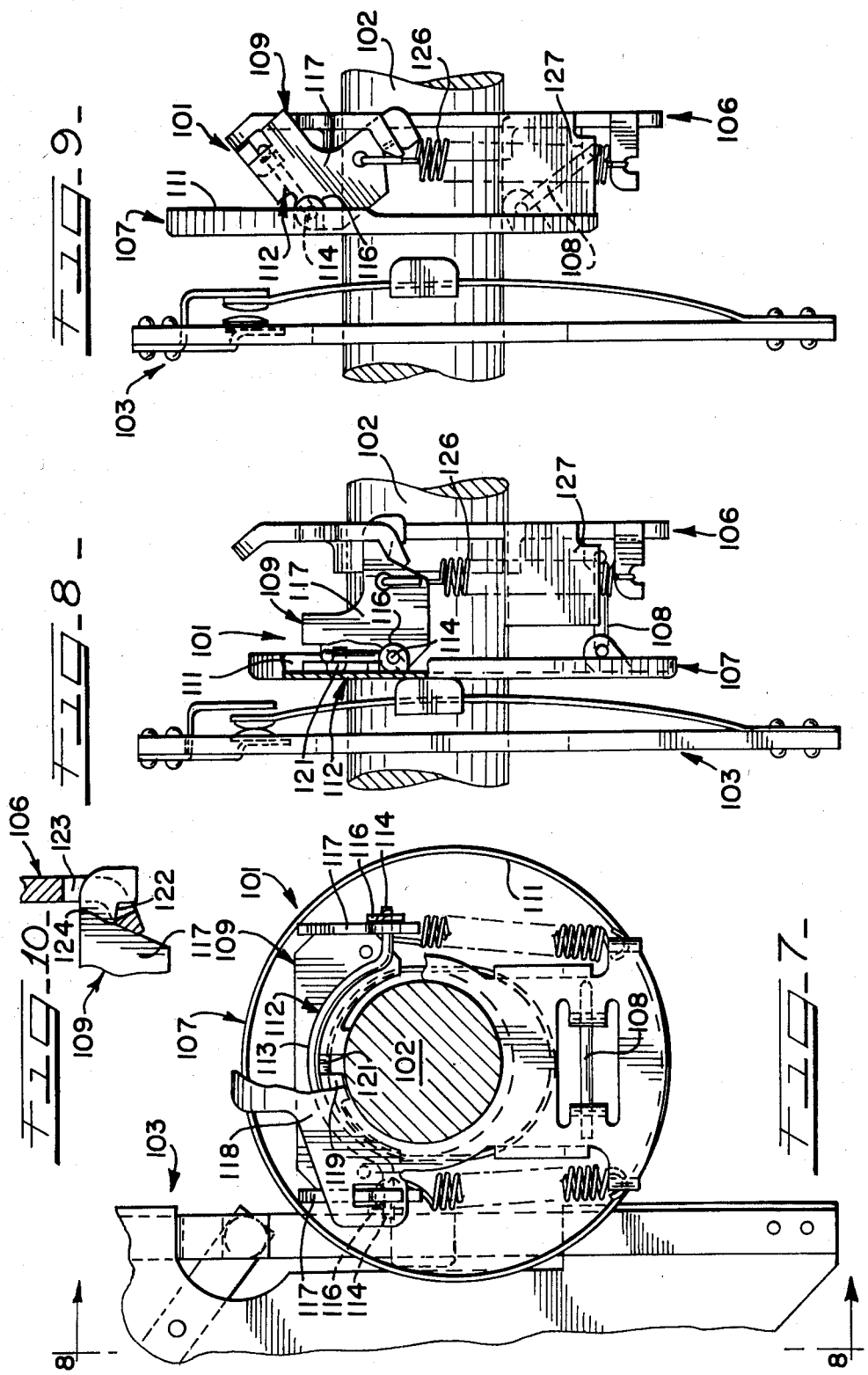

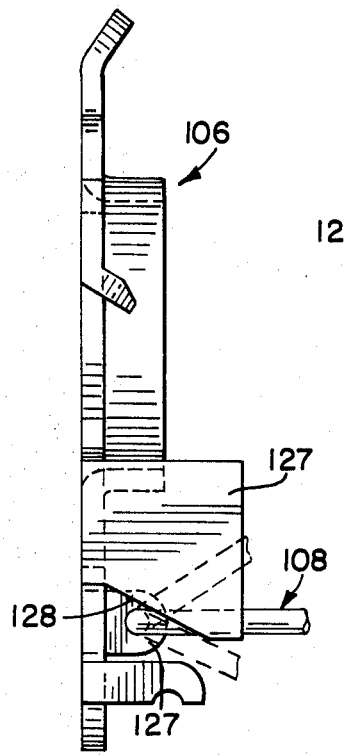
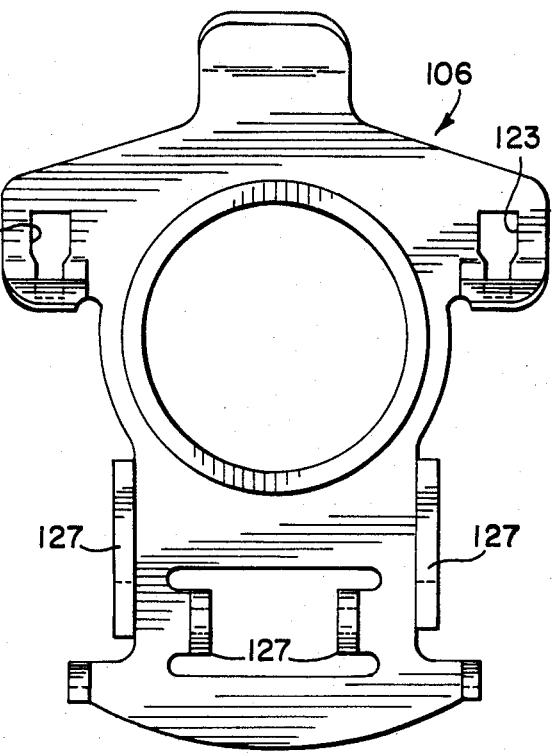
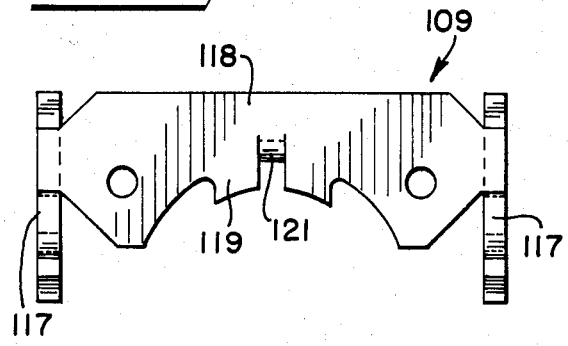
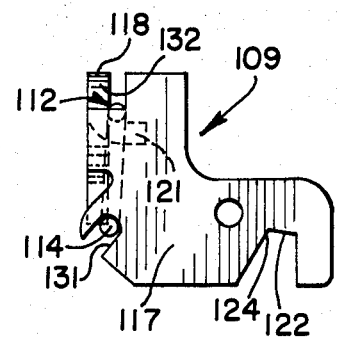

4,289,988

CENTRIFUGAL MECHANISM AND SWITCH

This patent application is a continuation-in-part application based on U.S. application Ser. No. 961,846 filed Nov. 20, 1978, and now abandoned.

U.S. Pat. No. 2,516,922, No. 3,244,832 and No. 3,521,496 disclose different designs of centrifugal mechanisms and switches. In U.S. Pat. No. 2,516,922, the mechanism includes weights which pivot on a support part and knife-edge connections are provided between them. The switch includes an annular track and the weights are adapted to engage the track in order to actuate the switch. While this arrangement has been widely used for many years and has performed well, it is somewhat expensive to manufacture and the provision of the track on the switch has made assembly of the motor parts somewhat difficult.

U.S. Pat. No. 3,244,832 and No. 3,521,496 show arrangements where the annular track is provided as part of the centrifugal mechanism and forms the weight. While such arrangements make possible a simplification of the switch, the mechanisms are relatively heavy and expensive, and they do not have the advantages of the low friction knife-edge pivotal connections.

Morse U.S. Pat. No. 2,610,314 discloses a motor speed control system including a centrifugal mechanism wherein an annular track forms part of the centrifugal mechanism.

It is a general object of this invention to provide an improved centrifugal mechanism and switch which overcome the foregoing disadvantages.

In accordance with the present invention, a centrifugal mechanism is provided for connection with a rotating shaft, the mechanism comprising a support part adapted to be secured to and rotate with the shaft, a weight pivotally connected to the support part and having its center of gravity to one side of the axis of the shaft, an annular member pivotally supported by said weight, and spring means for countering the centrifugal force acting on said weight. The annular member is pivotally supported for movement through parallel planes, and it is adapted to engage and actuate a switch in response to pivoting movement of the weight. The switch includes an arm adapted to be mounted adjacent the annular member and to be actuated by movement of the member and the weight.

The foregoing and other objects and advantages of the invention will become apparent from the following detailed description taken in conjunction with the accompanying drawings, wherein:

FIG. 1 is a view of an electric motor, partially cut away, including a centrifugal mechanism and switch embodying the present invention.

FIG. 2 is an enlarged sectional view taken on the line 2—2 of FIG. 1;

FIG. 3 is a fragmentary view taken on the line 3—3 of FIG. 2;

FIG. 4 is a view similar to FIG. 3 but showing different positions of the operating parts.

FIG. 5 is a sectional view on a reduced scale taken on the line 5—5 of FIG. 3; and FIG. 6 is a sectional view on a reduced scale taken on the line 6—6 of the FIG. 3.

FIG. 7 is similar to FIG. 2 but shows an alternate and preferred embodiment of the invention;

FIGS. 8 and 9 are similar to FIGS. 3 and 4 but show the embodiment illustrated in FIG. 7;

FIG. 10 shows a pivot mounting of the centrifugal mechanism;

FIGS. 11 and 12 are views of one part of the embodiment of FIG. 7; and

FIGS. 13 and 14 are views of another part of the embodiment shown in FIG. 7.

FIG. 1 illustrates an electric motor which may have a conventional construction aside from the centrifugal mechanism and switch in accordance with this invention. It should be understood that the invention is also useful in other applications. In the specific example illustrated, the electric motor includes an outer shell 10 secured to two end bells 11 and 12. A mount or stand 13 is connected to the shell 10 and supports the motor. The end bells 11 and 12 support bearings 14 which in turn rotatably support a motor shaft 16 having a rotor 17 secured thereto. On the inner periphery of the shell 10 is secured a stack of stator laminations 18 and stator windings 19. The motor is of the type wherein the stator windings 19 include a start winding and a run winding, and a centrifugal mechanism 21 and a switch 22, incorporating the present invention, are provided to control energization of the start winding. As is well known to those skilled in the art, at standstill and at low motor speeds, the switch 22 is closed and the motor start winding is connected in the power supply circuit. At motor speeds above a preset cutout level, the centrifugal mechanism 21 operates to open the switch 22 and to disconnect the start winding from the power supply circuit. Of course, when the motor speed slows down again, as when the power is turned off, the shaft 16 slows to the level where the centrifugal mechanism 21 again operates to close the switch 22 and reconnect the start winding to the power supply circuit in preparation for subsequent reenergization of the motor.

With a specific reference to FIGS. 2 to 5, the switch 22 comprises a switch spring arm 26 having a fixed end thereof secured as by rivets 27 to a switch mounting and terminal board 28. The arm 26 extends transversely of the shaft 16 and closely adjacent the centrifugal mechanism 21, and the other or free end of the arm 26 has a movable switch contact 29 (see FIGS. 3 and 4) secured to it. A fixed or stationary switch contact 31 is mounted on the board 28 adjacent the movable contact 29, the stationary contact 31 being supported by an electrically conductive leaf 32 (FIGS. 2 to 4). In the present example, the board 28 is secured to and supported by a member 33 (FIG. 1) which in turn is fastened to the end bell 12. Of course, the support for the board 28 is intended as a specific example and a different arrangement may be provided. The arm 26 and the leaf 32 (FIGS. 2 and 3) are electrically connected in series with the start winding as previously mentioned. At standstill and at low motor speeds (see FIG. 3), the two contacts 29 and 31 are closed by the centrifugal mechanism and the start winding is connected in the power circuit. On the other hand, at running speed of the motor (see FIG. 4), the two contacts 29 and 31 and the start winding is disconnected from the power circuit.

The switch contacts 29 and 31 are of course actuated between the open and closed positions by the centrifugal mechanism 21 as previously mentioned. An insulating member or tab 34 (FIGS. 3 and 4) is preferably secured to the arm 26 approximately midway along its length, in the area where the arm 26 extends closest to the centrifugal mechanism 21, and a part 42 (FIGS. 3 and 4) of the mechanism 21 is adapted to engage the tab 34 and to close the switch. The switch also includes a finger 36 (FIGS. 3 and 4) fastened to the board 28 adjacent the contacts 29 and 31, and the movable contact 29 extends between the stationary contact 31 and the finger 36. The free end of the arm 26 engages and is restrained by the finger 36 when the switch is open, thereby controlling the amount of contact opening.

The centrifugal mechanism 21 includes a support part or backplate 41 (FIGS. 3 and 4) which is secured to the motor shaft 16. With specific references to FIGS. 2 and 3, the backplate 41 is, in the present example, formed from a piece of flat sheet metal. A circular opening 43 (FIG. 2) is formed in the backplate 41 and a flange or collar 44 (FIG. 3) surrounds the opening 43, the internal diameter of the opening 43 being sized to tightly fit the outer surface of the shaft 16. Thus, the backplate 41 is secured to the shaft 16 by an interference fit with the shaft 16.

The centrifugal mechanism 21 further includes a disc 42 (FIGS. 3 and 5) which is, in the present example, formed from a piece of sheet metal and it has a central opening 47 (FIG. 6) that receives the shaft 16. The disc 42 is mounted between the backplate 41 and the switch arm 26. The side 46 (FIGS. 3 and 5) of the disc 42 which is adjacent the arm 26 is flat and smooth and forms a track which is adapted to engage the tab 34 (FIG. 3) when the mechanism 41 is in the normal or standstill position. The opening 47 (FIG. 5) is elongated in the direction of pivoting movement of the disc 42. The opening 47 is larger than the shaft so that the disc 42 is able to pivot without interference from the shaft 16 to the running position illustrated in FIG. 4.

The disc 42 is pivotally supported by the backplate 41, and the pivotable connection is formed by parallel arms so that the track or surface 46 of the disc 42 is maintained perpendicular to the axis of the shaft 16 and parallel to the main part of the backplate 41 during the pivoting movement. The pivotal connection between the backplate 41 and the disc 42 is formed by a hinge 51 (FIG. 3) and by a weight 52. Two spaced tabs 53 (FIG. 6) are formed on the disc 42 and the two spaced tabs 54 (FIGS. 3 and 4) are formed on the backplate 41, the tabs being formed as by punching and bending, and a pivot hole 56 is formed in each of the tabs. As shown in FIG. 6, the two tabs 53 on the movable disc 42 are spaced on opposite sides of the center line or axis of rotation of the shaft 16, and the two tabs 54 on the backplate 41 are similarly spaced. The hinge 51 (FIGS. 3 and 6) has a U-shaped configuration, one arm of the U extending through the holes in the tabs 54, and the center portion 57 of the U extending between the tabs 53 and 54 and forming a hinge arm.

The weight 52 (FIGS. 3 and 4) serves as both a centrifugal weight and as a hinge or pivot connection, and in the present instance it is formed from a piece of sheet metal which is bent to a generally U-shape. The center or connecting part of the U extends laterally of the shaft 16 and is indicated by the numeral 61 in FIG. 6, and the two arms 60 of the weight 52 extend parallel to the shaft 16 and they extend between the members 41 and 42 (see FIG. 3). A radial projection 62 (FIG. 6) at the middle of the connecting portion 61 is shaped to conform to and engage the outer surface of the motor shaft 16 when the centrifugal mechanism is in the normal or standstill position, as shown in FIG. 6, and the connecting portion 61 extends transversely of and across the shaft 16. The weight 52 is pivotally connected to the movable disc 42 by a generally U-shaped bale 63 (FIGS. 2 to 4) which is secured to the movable disc 42 by a plurality of fingers 64 formed on the edge of the disc 42. The fingers 64 are crimped over and tightly engage the center section of the bale 63. The ends of the bale 63 are bent to turn laterally inward as indicated by the numeral 66 in FIG. 6, and the end portions 66 are positioned in notches formed in the ends of a pair of spaced tabs 67 (FIGS. 3, 4 and 6) punched from the disc 62. The end portions 66 also extend through pivot holes 68 (FIGS. 3 and 4) formed in the weight 52. The holes 68 in the weight 52 are large enough that the end portions 66 of the bale 63 may pivot freely in them.

The outer ends of the two arms 60 of the weight 52 have notches 71 formed in them, each of the notches 71 forming a corner 72. As shown in FIG. 2, the backplate 41 has holes 73 formed in it, the two holes 73 being spaced on opposite sides of the center line of the shaft 16. The outer ends of the arms 60 of the U-shaped weight 52 extend through the holes 73 and the portions 74 (FIGS. 2 and 4) of the backplate 41 containing a portion of the holes 73 are bent in the direction of the disc 42, as indicated in FIGS. 3 and 4. The corners 72 of the notches 71 engage the adjacent edges of the holes 73 and thus form a knife edge engagement as illustrated in FIG. 3. As previously mentioned, this knife edge engagement reduces the amount of friction between the weights 52 and the backplate 41.

With reference to FIG. 3, it will be noted that the distances between the two arms of the U-shaped hinge 51 is equal to the distance from the center of the pivot holes 68 to the knife edge connections between the corners 72 of the notches 71 and the edges of the holes 73. As the disc 42 swings or pivots relative to the backplate 41, the arms of the hinge 51 turn in the mounting holes in the tabs 53 and 54 and the weight 52 pivots on the end portions 66 of the bale 63 and on the knife edge pivots. Due to the parallel arm arrangement, the surface 46 of the disc 42 is maintained parallel to the backplate 41 and perpendicular to the axis of the shaft 16 during pivoting movement.

As shown in FIGS. 2 to 4, connected between the backplate 41 and the weight 52 are a pair of tension springs 81 which counter the centrifugal force, one of the springs 81 being located on each side of the axis of the shaft 16. Each of the arms 60 of the weight 52 has a hole 82 formed in it, and one end of a spring 81 is connected in one of the holes 82. The other ends of the two springs 81 are connected to the opposite side of the backplate adjacent the hinge 51. Two tabs 83 are formed on the backplate 41 adjacent the hinge 51, and the turned ends of the springs 81 are connected to notches formed in the tabs 83. As shown in FIGS. 2 and 6, the weight 52 extends over one side of the shaft 16, which is the side opposite from the tabs 83, and the two tension springs 81 urge the weight 52 to the position shown in FIGS. 2 and 3 where the portion 62 of the weight 52 engages the upper side of the shaft. This, of course, is the normal or standstill position of the centrifugal mechanism. In the running position of the mechanism shown by FIG. 4, the center portion 61 of the weight 52 engages a stop 65 formed on the upper end of the backplate 41.

At the two ends of the hinge 51 arm which is connected to the backplate 41 are formed two locking tabs 86 (FIGS. 2 to 4) which extend across the outer ends of the hinge 51. The tabs 86 are punched from the plate 41 and prevent the hinge 51 from moving out of place during use of the mechanism. A corner of at least one of the two tabs 86 is cut away to permit assembly of the parts, as will be described in connection with FIG. 11.

Regarding the distribution of weight in the centrifugal mechanism, the weight 22 is to one side of the motor shaft 16 axis, and therefore its center of gravity is displaced from the shaft axis. The disc 42 is preferably unbalanced and has more weight on the side toward the weight 52, this unbalance being produced by the bale 63, in the specific example being described. In other forms of the invention, the weight of the disc 42 may be distributed to obtain the desired operating characteristics. The rotation of the shaft produces a centrifugal force on the weight 52 and on the disc 42, and the springs 81 produce a counterforce. When the weight 52 starts to swing outwardly on the knife edges, the centrifugal force increases, causing a snap action. The force on the disc 42 of the switch arm 26 is axially directed and the pivot axis of the hinge 51 and the weight 52 are axially aligned when in the standstill position, and consequently the arm 26 force does not tend to pivot the disc 42. When in the running position shown in FIG. 4, the centrifugal mechanism as a whole is substantially balanced around the shaft 16 axis.

FIGS. 7 to 14 illustrate an alternate and preferred form of the centrifugal mechanism, indicated by the reference numeral 101. The mechanism 101 is secured to a motor shaft 102 adjacent a switch 103 that may be the same as the switch 22. The mechanism 101 includes a backplate 106, a disc 107, a U-shaped hinge 108, and a weight 109 that also acts as a hinge.

The disc 107 is similar to the disc 42, the difference being that the disc 107 does not include the clinched or crimped fingers 64. The disc 107 includes a circular flange or lip 111 at its outer edge that serves to stiffen the disc.

The weight 109 (FIGS. 7 to 9, 13 and 14) is constructed similarly to the weight 52, the difference being that the weight 109 is designed to be secured to a bale 112 that swings with the weight. In the mechanism shown in FIGS. 1 to 6, the bale 63 is secured to the disc 42 by the crimped fingers 64, and end portions 66 of the bale form pivot connections between the disc and the weight. In the mechanism shown in FIGS. 7 to 14, in order to reduce the total weight of the disc and to form a more rugged support for the bale, the bale 112 is secured to and swings with the weight 109.

With reference to FIG. 7, the central portion 113 of the bale 112 is generally semi-circular and extends over the side of the shaft 102 which is adjacent the weight 109. The end portions 114 of the bale 112 are bent outwardly as shown in FIG. 7 and extend through pivot holes formed in two tabs 116 formed on the disc 107. The weight includes a central connecting portion 118 (FIGS. 7, 13, and 14) that extends transversely across the shaft 102 between the arms 117, and the central portion 113 of the bale extends closely adjacent the connecting portion 118. A radial projection 119, similar to the projection 62, has a tab 121 bent to extend under the central portion 113 of the bale 112. Thus, the bale 112 is secured to and swings with the weight 109. Each arm 117 of the weight 109 has a notch or slot 131 (FIG. 14) formed in it which receives the end portions 114 of the bale 112. The provision of the notches 131 is preferred for the weight 109, instead of pivot holes, because it simplifies the assembly of the parts. FIG. 14 shows in dashed lines the position of the bale 112 on the weight 109, and it will be noted that, due to an offset of the notches 131 relative to the right-hand surface 132 of the connecting portion 118, the bale 112 angles or slants upwardly and toward the right from its end portions 114. The bale and the weight are assembled by positioning the end portions 114 in the notches 131 and snapping the central portion 113 over the tab 121. The length of the tab 121 and the above-mentioned angle ensure a secure connection of the parts and location of the bale 112.

FIG. 10 illustrates the knife-edge pivot connection between the weight 109 and the backplate 106. Each arm 117 of the weight 109 has a notch 122 formed in it and each notched portion extends through a hole 123 (FIGS. 10 and 12) formed in the backplate 106. Knife edges or corners are formed as indicated at 124, which form a low friction pivot connection between the weight 109 and the backplate 106. The mechanism shown in FIGS. 1 to 6 has the same pivot connection shown in FIG. 10.

The arrangement of the bale shown in FIGS. 7 to 9 is advantageous because the disc 107 does not carry the weight of the bale 112. The disc is not therefore subject to failure due to the weight of the bale. Further, the assembly of the bale with the weight as shown in FIGS. 7 to 9 is simpler than the assembly method to produce the construction of FIGS. 1 to 6 because it is not necessary to crimp a plurality of small fingers. Aside from the differences noted above, the construction and operation of the centrifugal mechanism 101 and the switch 103 are the same as the arrangement shown in FIGS. 1 to 6. At standstill and at low motor speeds, the disc 107 and the weight 109 are held in the position shown in FIG. 8 by a pair of springs 126, but as the motor approaches running speed, the centrifugal force acting on the weight 109 and the bale 112 causes the parts to swing with a snap action to the FIG. 9 position. The weight 109 has a relatively thick, heavy construction and therefore is able to support the weight of the bale 112 without failing, in spite of the snap action mode of operation. Further, the arrangement shown in FIGS. 7 to 9 comprises a simplified method of assembling the bale with the other parts of the mechanism.

Regarding the U-shaped hinge 108, two tabs 127 (FIGS. 8, 9, 11 and 12) extend across the ends of the hinge to hold it assembled with the mechanism. With reference to FIG. 11, the solid line position of the hinge 108 shows the standstill position illustrated in FIG. 8, and the upper dash line position shows the running position illustrated in FIG. 9. One of the tabs 127 has a corner removed as indicated at 128 to permit assembly with the hinge 108. Before the centrifugal mechanism is mounted on the shaft 102, the hinge 108 is placed in the lower dash line position shown in FIG. 11 where it clears the tab 127 having the removed corner 128. After assembly with the backplate 106 and the disc 107, the hinge 108 is pivoted to the standstill and running positions, and the tab 127 prevents removal of the hinge 108.

The operation of the two forms of the centrifugal mechanism and the switch is similar. With reference to the form shown in FIGS. 1 to 7, assume that the motor is de-energized and that the motor shaft is stationary. The two tension springs 81 hold the weight 52 in the standstill position where the projection 62 engages the surface of the shaft 16 (FIGS. 3 and 6). The centrifugal mechanism 21 is mounted on the shaft 16 adjacent the switch 22 and close enough that the disc track or surface 46 engages the tab 34 (FIG. 3) and exerts pressure on the tab 34 to press the contact 29 into engagement with the stationary contact 31. As previously mentioned, in this position of the switch contacts the start winding circuit of the motor is connected to be energized by the power supply. When the power supply is turned on, the shaft 16 turns and the centrifugal force acting on the weight 52 causes the disc 42 to swing and open the switch contacts 29 and 31 at a predetermined shaft speed (as shown by FIG. 4). When the shaft is turning at lower than running speed, the tab 34 slides on the surface 46 as the mechanism 21 turns. This surface, of course, is maintained in parallel planes as the disc 42 swings between its two positions. When the motor speed subsequently slows down, the spring 81 force overcomes the centrifugal force and the disc 42 swings back to the FIG. 3 position and the contacts 29 and 31 reclose.

Apparatus in accordance with the invention has a number of advantages. The switch is relatively uncomplicated and reliable, and it simplifies the assembly of the motor parts. The two forms of the mechanism utilize the low friction knife-edge pivot connections which support the weight, and the knife-edge connection has an extremely long life. The discs that form the switch engaging track are lightweight and readily supported, and consequently they do not excessively wear the pivot hinge connections. The weight is acted upon only by the centrifugal force and the springs, and it may be calibrated before being assembled with the shaft and the switch.

I claim:

1. In an electric motor including a rotatable shaft and a switch connected to control energization of a winding of the motor, the improvement comprising a centrifugal mechanism for actuating the switch, said mechanism comprising a support part secured to and rotating with the shaft, a movable annular member having a central opening receiving the shaft therethrough, a weight having its center of gravity to one side of the axis of rotation of the mechanism and the shaft, said weight extending between said support part and annular member and being pivotally connected to said part and said member, said weight and said member swinging outwardly due to centrifugal force upon rotation of said mechanism, said weight and said annular member having a standstill position that exists when said mechanism is stationary and a running position that exists when said mechanism is turning at above a predetermined speed, centrifugal force acting on said weight and causing said outward swinging movement to said running position, and counterforce means directly connected to said weight and said support part and extending therebetween and causing movement to said standstill position, said annular member being adapted to engage said switch and said swinging movement of said annular member being adapted to actuate the switch.

2. A mechanism as in claim 1, wherein said annular member is unbalanced around the shaft axis when in said standstill position.

3. A mechanism as in claim 1, wherein said weight and said pivotal connections thereto are on said one side of said axis, and a hinge is pivotally connected between said annular member and said part on the side of the axis which is opposite said one side, said hinge and said weight forming a parallel arm connection.

4. A mechanism as in claim 1, wherein said pivotal connection between said weight and said support part is a knife-edge pivot connection.

5. A mechanism as in claim 3 wherein, when said weight and said annular member are in the standstill position, the pivotal connections to said weight are axially spaced and the pivotal connections to said hinge are axially spaced.

6. A mechanism as in claim 1, wherein said weight is pivotally connected to said annular member by bale means, said weight and said annular member having pivot means formed therethrough and end portions of said bale means extending through said end means.

7. A mechanism as in claim 6, wherein said bale means is attached to said weight.

8. A mechanism as in claim 7, wherein said bale means includes a center part and said weight includes a tab, said bale extending at an angle between said pivot means and said tab.

9. A mechanism as in claim 6, wherein said bale means is attached to said annular member.

10. A mechanism as in claim 6, wherein said pivot means comprises holes in said annular member and notches in said weight.

11. A mechanism as in claim 6, wherein said pivot means comprises holes in said weight and notches in said annular member.

12. In an electric motor including a shaft that is rotatable on an axis, the improvement comprising a centrifugal mechanism and switch assembly, said mechanism comprising a support part secured to and rotating with the shaft, a movable annular member having a central opening receiving the shaft therethrough, a weight having its center of gravity to one side of the axis of rotation of the shaft, said weight extending between said support part and said annular member and being pivotally connected directly to said part and to said member, said weight and said annular member having a standstill position that exists when said shaft is stationary and a running position that exists when said shaft is turning at above a predetermined speed, centrifugal force acting on said weight and causing pivotal movement of said weight and said member to said running position, and counterforce means directly said weight and said support part and extending therebetween and causing movement to said standstill position, said switch assembly being mounted adjacent and being engageable by said annular member and movement of said annular member acting to actuate said switch assembly.

13. An assembly as in claim 12, wherein said switch arm and support means secured to one end of said arm, the other end of said arm forming a movable contact, a fixed contact mounted on said support means adjacent said movable contact, said arm extending transversely of the shaft and closely adjacent said annular member, said annular member forming a track which is engagable with said arm.

14. An assembly as in claim 13, wherein said switch further includes a tab attached to said arm and adapted to engage said arm.

15. A centrifugal mechanism for actuating a switch comprising a rotatable support part adapted to be rotated on an axis, a movable part connected to said support part and movable between a standstill position and a running position, said movable part comprising a weight having one end thereof pivotally attached to said support part, said weight having its center of gravity to one side of the axis and the centrifugal force due to rotation of said mechanism operating to pivot said weight toward said one side, counterforce means directly connected to said weight and said support part and extending therebetween and countering said centrifugal force, and an annular member pivotally connected directly to the other end of said weight and carried by said weight in said pivoting movement and pivotally connected to said support part by said weight.

* * * * *